US012671211B2

(12) United States Patent
Zhang et al.

(10) Patent No.: US 12,671,211 B2

(45) Date of Patent: Jun. 30, 2026

(54) CONNECTOR HOUSING AND A CONNECTOR

(71) Applicant: Tyco Electronics (Shanghai) Co., Ltd., Shanghai (CN)

(72) Inventors: Wenfang (Felix) Zhang, Shanghai (CN); Yongjian (Justin) Huang, Shanghai (CN); Tongbao (Tim) Ding, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 494 days.

(21) Appl. No.: 17/945,232

(22) Filed: Sep. 15, 2022

(65) Prior Publication Data

US 2023/0081142 A1 Mar. 16, 2023

(30) Foreign Application Priority Data

Sep. 16, 2021 (CN) .......................... 202111085112.8

(51) Int. Cl.
*H01R 13/631* (2006.01)
*H01R 24/00* (2011.01)

(52) U.S. Cl.
CPC ........... *H01R 13/631* (2013.01); *H01R 24/00* (2013.01)

(58) Field of Classification Search
CPC ................ H01R 13/631; H01R 12/716; H01R 2107/00; H01R 24/60; H01R 12/7005; H01R 13/64; H01R 13/642; H01R 13/11; H01R 13/361; H01R 24/00; H01R 24/20
See application file for complete search history.

(56) References Cited

U.S. PATENT DOCUMENTS

| | | | | | |
|---|---|---|---|---|---|
| 6,761,488 | B2 * | 7/2004 | Weigel | G02B 6/3893 | 439/376 |
| 7,744,429 | B2 * | 6/2010 | Zhang | H01R 12/7023 | 439/620.11 |
| 2019/0081427 | A1 * | 3/2019 | Ohtaka | H01R 13/11 | |

FOREIGN PATENT DOCUMENTS

| | | | | | |
|---|---|---|---|---|---|
| JP | 2017168402 | A * | 9/2017 | | |
| WO | WO-2016097903 | A1 * | 6/2016 | H01R 13/111 | |

OTHER PUBLICATIONS

English Translation of JP 2017168402 (Year: 2017).*
English translation of JP 2017168402 (Year: 2025).*

* cited by examiner

*Primary Examiner* — Tulsidas C Patel
*Assistant Examiner* — Carlos E Lopez-Pagan
(74) *Attorney, Agent, or Firm* — Barley Snyder

(57) ABSTRACT

A connector housing includes a body having a first accommodating cavity accommodating a first terminal. A first insertion hole penetrates a first surface of the body and communicates with the first accommodating cavity. A guiding portion of the body surrounds at least a portion of the first insertion hole.

18 Claims, 6 Drawing Sheets

CONNECTOR HOUSING AND A CONNECTOR

CROSS-REFERENCE TO RELATED APPLICATIONS

This application claims the benefit of the filing date under 35 U.S.C. § 119(a)-(d) of Chinese Patent Application No. 202111085112.8, filed on Sep. 16, 2021.

FIELD OF THE INVENTION

The present invention relates to electrical connection technology, and more particularly, to a connector housing and a connector.

BACKGROUND

A connector currently used in electrical connection (for example, in the electrical connection of an air compressor) cannot match with a mating structure quickly and accurately in place, due to lack of a pre-assembled positioning structure. This is not conducive to automating the electrical connection installation process. Therefore, there is a critical need for a connector which is more easily operated and can facilitate quick and accurate assembly.

SUMMARY

A connector housing includes a body having a first accommodating cavity accommodating a first terminal. A first insertion hole penetrates a first surface of the body and communicates with the first accommodating cavity. A guiding portion of the body surrounds at least a portion of the first insertion hole.

BRIEF DESCRIPTION OF THE DRAWINGS

The present invention will become more apparent by describing in detail exemplary embodiments thereof with reference to the accompanying drawings, in which.

DETAILED DESCRIPTION OF THE EMBODIMENTS

Figure 1:
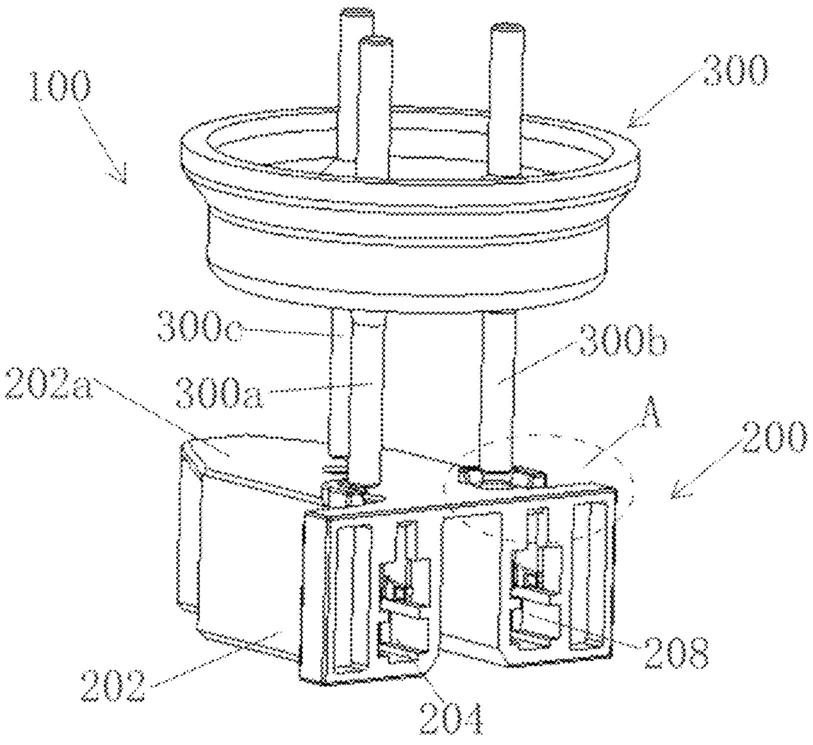
FIG. 1 is an exploded perspective view of a connector according to a first embodiment.

In the detailed descriptions of the following embodiments, reference will be made to the accompanying drawings which form a part of the present invention. The accompanying drawings show, by way of example, specific embodiments in which the present invention can be practiced. The exemplary embodiments are not intended to describe all embodiments in accordance with the present invention. In the specification, same or similar reference numerals refer to same or similar components. It can be understood that other embodiments may be utilized and structural changes may be made without departing from the scope of the present invention. Therefore, the following detailed description is not intended to be limiting, and the scope of the present invention is defined by the appended claims.

The terms "including", "comprising" and the like used herein, should be understood to mean open-ended terms, (i.e., meaning "comprising/including, but not limited to"), meaning that other contents may also be included. The term "one embodiment" means "at least one embodiment"; the term "another embodiment" means "at least one additional embodiment" and so on.

Electrical connection in an air compressor is exemplified to provide a detailed description of the embodiments of the present invention in conjunction with the drawings.

In the embodiment shown in FIGS. 1-6, a connector 100 comprises a first terminal 400*a* (shown in FIG. 6), a second terminal, and a connector housing 200. The connector housing 200 comprises a body 202 which includes a first accommodating cavity 204, a second accommodating cavity 208, a first insertion hole 210, and a second insertion hole 212. The first accommodating cavity 204 is configured to accommodate the first terminal 400*a*, and the second accommodating cavity 208 is configured to accommodate the second terminal. The first insertion hole 210 penetrates a first surface 202*a* of the body 202 and communicates with the first accommodating cavity 204, and the second insertion hole 212 penetrates the first surface 202*a* of the body 202 and communicates with the second accommodating cavity 208.

Figure 2:
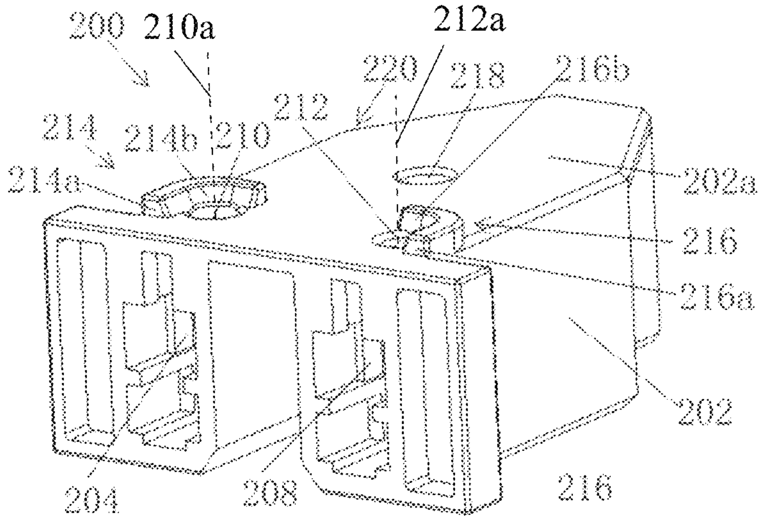
FIG. 2 is a perspective view of a connector housing of the connector of FIG. 1.

A guiding portion 220 comprises a first sub-guiding portion 214 and a second sub-guiding portion 216, as shown in FIG. 2. The first sub-guiding portion 214 surrounds a portion of the first insertion hole 210, is coaxial with a first axis 210*a* of the first insertion hole 210, and is configured to guide a first conductor 300*a* (for example, a metal pillar) of a conductive connection 300 into the first insertion hole 210, and the second sub-guiding portion 216 surrounds a portion of the second insertion hole 212, is coaxial with a second axis 212*a* of the second insertion hole 212, and is configured to guide a second conductor 300*b* (for example, a metal pillar) of the conductive connection 300 into the second insertion hole 212. It should be understood that, in another embodiment, the first sub-guiding portion 214 completely surrounds the first insertion hole 210, and the second sub-guiding portion 216 completely surrounds the second insertion hole 212. In another embodiment, the first sub-guiding portion 214 is integrally connected to the second sub-guiding portion 216, though in the embodiment shown in FIGS. 1-3, the first sub-guiding portion 214 is completely spaced apart from the second sub-guiding portion 216.

Figure 3:
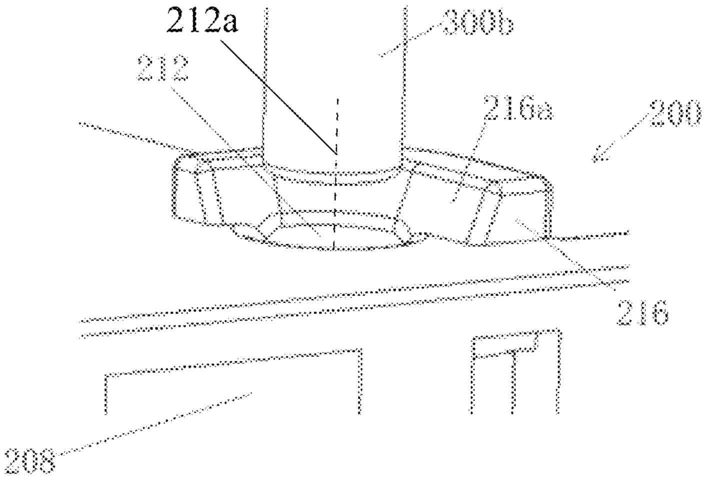
FIG. 3 is an enlarged view of a region A of FIG. 1.
Figure 4:
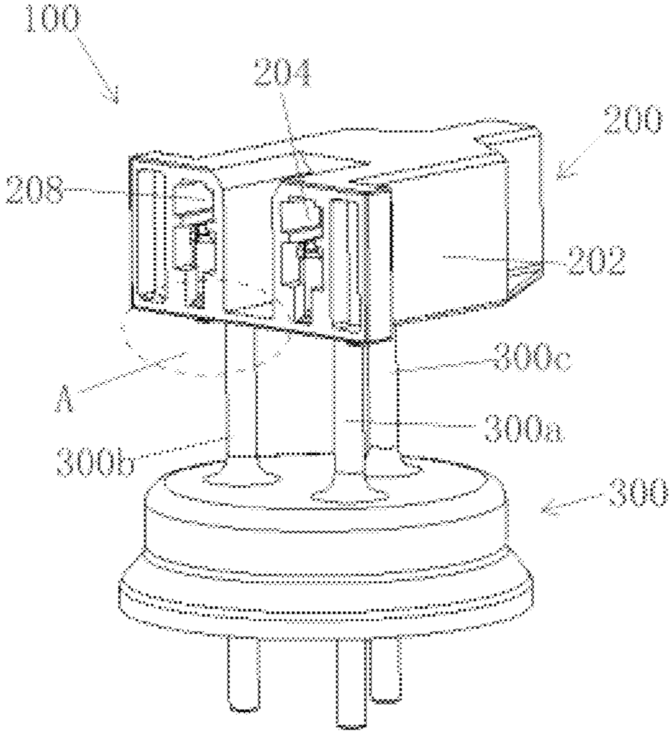
FIG. 4 is another exploded perspective view of the connector of FIG. 1.
Figure 5:
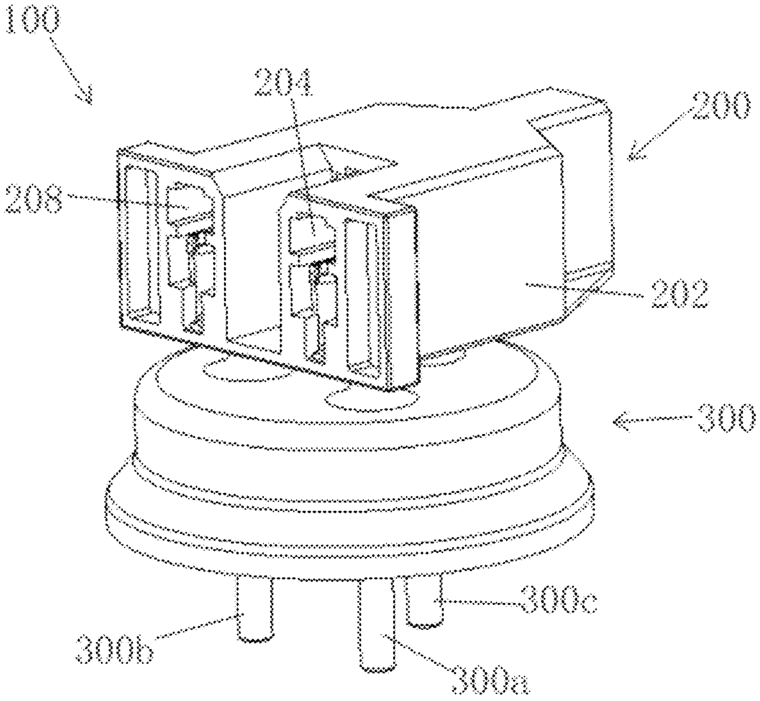
FIG. 5 is a perspective view of the connector of FIG. 1 in an assembled state.

As shown in FIGS. 2 and 3, the first sub-guiding portion 214 and the second sub-guiding portion 216 respectively comprise a first protrusion 214*a* and a second protrusion 216*a* which extend outwardly from the first surface 202*a*. The first protrusion 214*a* has a first guiding surface 214*b* relative to the first surface 202*a*, which makes it easier to guide the first conductor 300*a* into the first insertion hole 210, and the second protrusion 216*a* has a second guiding surface 216*b* that is tilted relative to the first surface 202*a*, which makes it easier to guide the second conductor 300*b* into the second insertion hole 212. It should be understood that, in another embodiment, the first protrusion 214*a* without the tilted first guiding surface 214*b*, and the second protrusion 216*a* without the tilted second guiding surface 216*b*, may also facilitate guiding functions.

The connector housing 200 further comprises a third accommodating cavity and a third insertion hole 218 (shown in FIG. 2); the third accommodating cavity is configured to accommodate a third terminal. The third insertion hole 218 penetrates the first surface 202*a* of the connector housing 202 and communicates with the third accommodating cavity, wherein when the conductive connection 300 is mounted on the connector housing 202, the first terminal 300*a* of the conductive connection 300 enters into the first insertion hole 210 via the guidance of the first sub-guiding portion 214 and forms an electrical connection with the first terminal 400*a* in the first accommodating cavity 204. The second conductor 300*b* of the conductive connection 300 enters into the second insertion hole 212 via the guidance of the second sub-guiding portion 216 and forms an electrical connection with the second terminal in the second accommodating cavity 208. A third conductor 300*c* of the conductive connection 300 enters into the third insertion hole 218 and forms an electrical connection with the third terminal.

When the connector 200 is completely assembled, one end of wire 500*a*, one end of wire 500*b*, and one end of wire 500*c* form electrical connections with one end of the first conductor 300*a*, one end of the second conductor 300*b*, and one end of the third conductor 300*c* of the conductive connection 300, via the first terminal 400*a*, the second terminal, and the third terminal respectively. The other end of the first conductor 300*a*, the other end of the second conductor 300*b*, and the other one end of the third conductor 300*c* are connected to the air compressor, and the other end of wire 500*a*, the other one end of wire 500*b*, and the other one end of wire 500*c* are connected to power supply, providing power supply for the air compressor.

Figure 6:
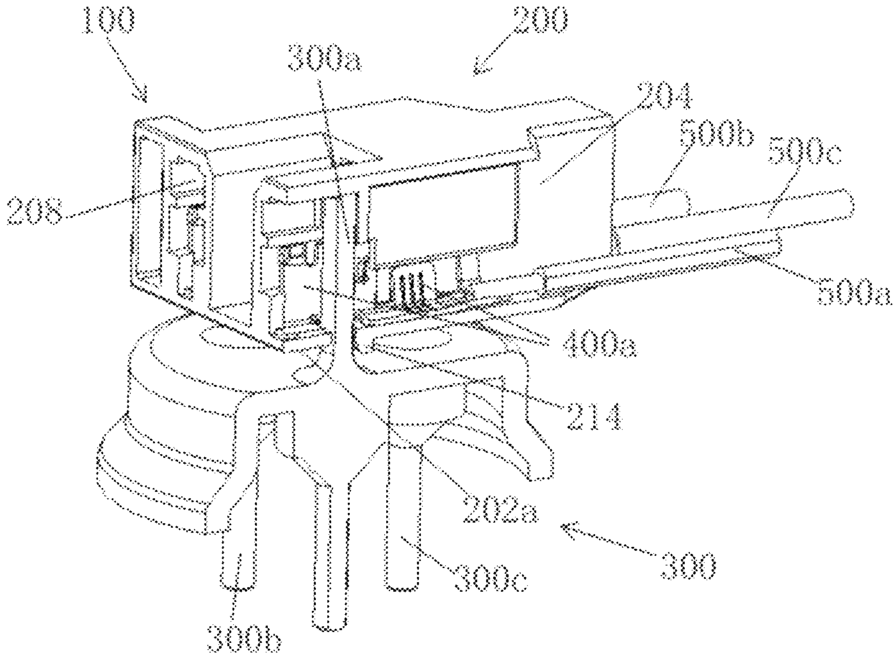
FIG. 6 is a sectional perspective view of the connector of FIG. 5.
Figure 7:
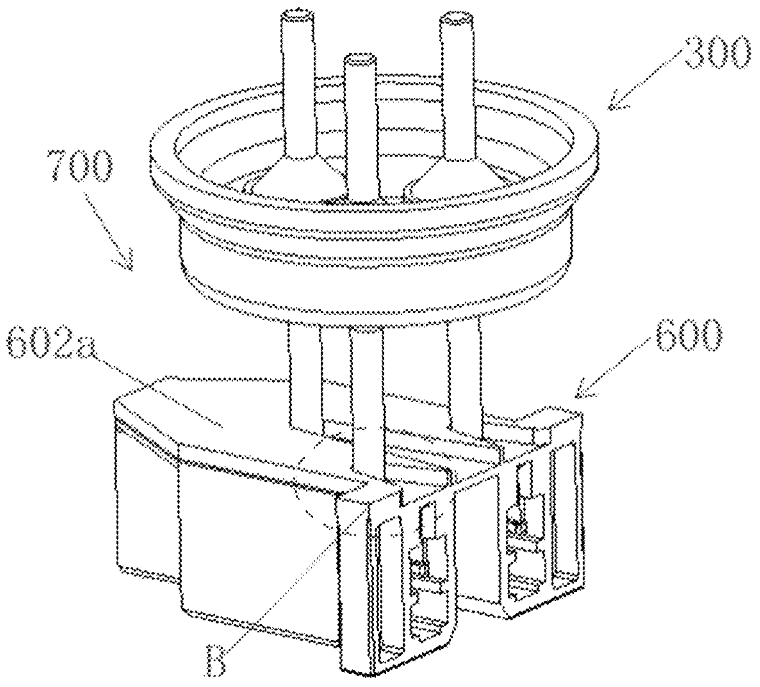
FIG. 7 is an exploded perspective view of a connector according to a second embodiment.
Figure 8:
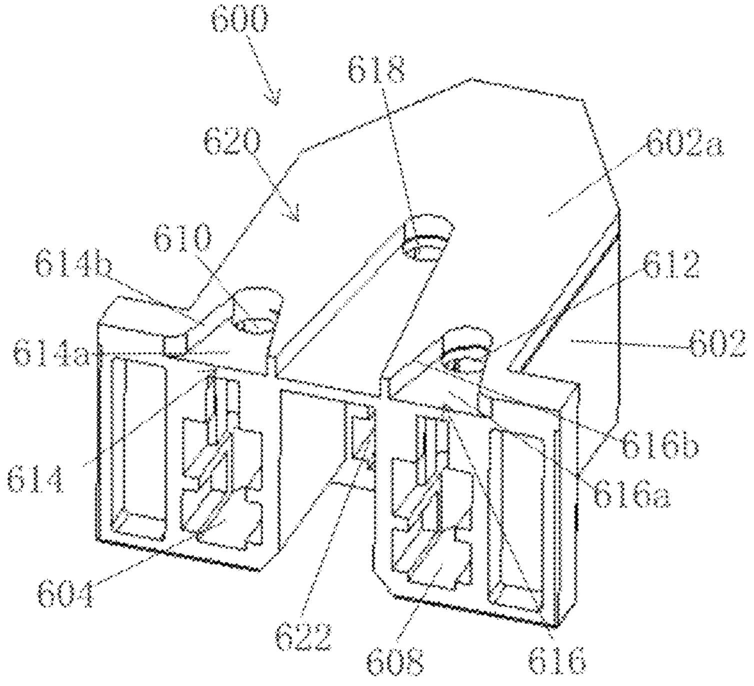
FIG. 8 is a perspective view of a connector housing of the connector of FIG. 7.
Figure 9:
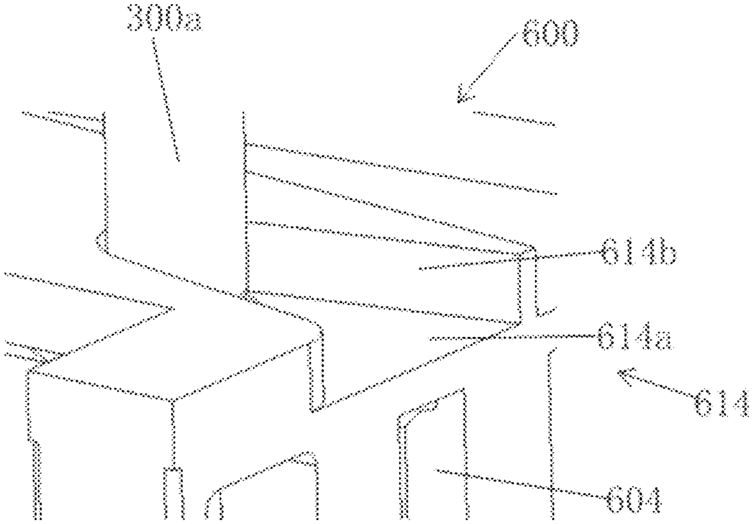
FIG. 9 is an enlarged view of a region B of FIG. 7.
Figure 10:
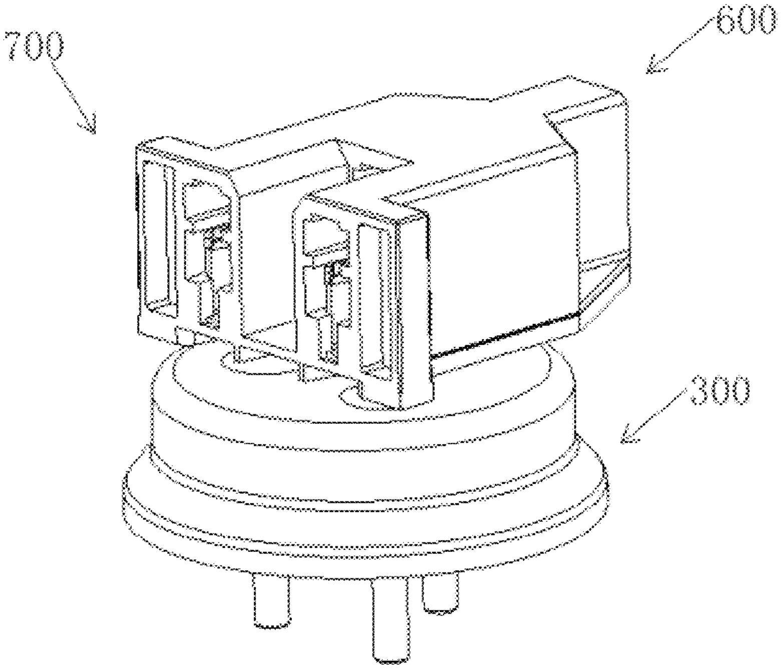
FIG. 10 is a perspective view of the connector of FIG. 7 in an assembled state.
Figure 11:
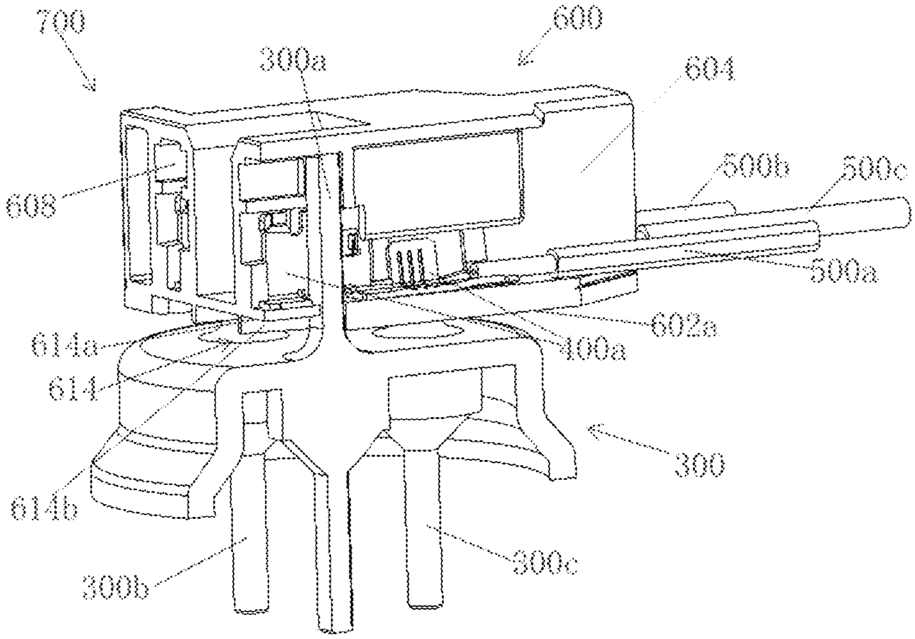
FIG. 11 is a sectional perspective view of the connector of FIG. 7.

In the second embodiment shown in FIGS. 7-11, a connector 700 comprises a first terminal 400*a* (as shown in FIG. 6), a second terminal, a third terminal, and a connector housing 600. The connector housing 600 comprises a body 602 which includes a first accommodating cavity 604, a second accommodating cavity 608, a third accommodating cavity 622, a first insertion hole 610, a second insertion hole 612, and a third insertion hole 618. The first accommodating cavity 604 is configured to accommodate the first terminal 400*a*, and the second accommodating cavity 608 is configured to accommodate the second terminal. The third accommodating cavity 622 is configured to accommodate the third terminal. The first insertion hole 610 penetrates a first surface 602*a* of the body 602 and communicates with the first accommodating cavity 604, the second insertion hole 612 penetrates the first surface 602*a* of the body 602 and communicates with the second accommodating cavity 608, and the third insertion hole 618 penetrates the first surface 602*a* of the body 602 and communicates with the third accommodating cavity 622.

For the second embodiment shown in FIGS. 7-11 and the first embodiment shown in FIGS. 1-6, the majority of structures are similar, and the distinction is that the structure of a guiding portion 620 is different from that of the guiding portion 220.

The guiding portion 620 comprises a first sub-guiding portion 614 and a second sub-guiding portion 616. The first sub-guiding portion 614 surrounds a portion of the first insertion hole 610 and is configured to guide the first conductor 300*a* (for example, a metal pillar) of the conductive connection 300 into the first insertion hole 610. The second sub-guiding portion 616 surrounds a portion of the second insertion hole 612 and is configured to guide the second conductor 300*b* (for example, a metal pillar) of the conductive connection 300 into the second insertion hole 612. In an embodiment, the first sub-guiding portion 614 and the second sub-guiding portion 616 respectively comprise a first recess 614*a* and a second recess 616*a* that are formed by being recessed from the first surface 602*a* towards the interior of the connector housing 602. The first recess 614 has a first sidewall 614*b* that is perpendicular to the first surface 602*a*, and the second recess 616 has a second sidewall 616*b* that is perpendicular to the first surface 602*a*. In another embodiment, the first recess 614 has the first sidewall 614*b* that is tilted relative to the first surface 602*a*, which makes it easier to guide the first conductor 300*a* into the first insertion hole 610, and the second recess 616 has the second sidewall 616*b* that is tilted relative to the first surface 602*a*, which makes it easier to guide the second conductor 300*b* into the second insertion hole 612.

As shown in FIGS. 7-11, when the conductive connection 300 is mounted on the connector housing 602, the first conductor 300*a* of the conductive connection 300 enters into the first insertion hole 610 via the guidance of the first sub-guiding portion 614 and forms an electrical connection with the first terminal 400*a* of the first accommodating cavity 604, the second conductor 300*b* of the conductive connection 300 enters into the second insertion hole 612 via the guidance of the second sub-guiding portion 616 and forms an electrical connection with the second terminal of the second accommodating cavity 608, and the third conductor 300*c* of the conductive connection 300 enters into the third insertion hole 618 and forms an electrical connection with the third terminal. When the connector 700 is completely assembled, one end of wire 500*a*, one end of wire 500*b*, and one end of wire 500*c* form electrical connections with one end of the first conductor 300*a*, one end of the second conductor 300*b*, and one end of the third conductor 300*c* of the conductive connection 300, via the first terminal 400*a*, the second terminal, and the third terminal respectively. The other end of the first conductor 300*a*, the other end of the second conductor 300*b*, and the other one end of the third conductor 300*c* are connected to the air compressor, and the other end of wire 500*a*, the other one end of wire 500*b*, and the other one end of wire 500*c* are connected to power supply, providing power supply for the air compressor.

The connector housing provided by the present invention is capable of making the connector matched with a mating structure quickly and accurately, which is beneficial for automating the electrical connection installation process.

It should be understood that the embodiments above provide a description of a connector housing and a connector by taking an example of the application scenario of an air compressor, the connector housing and the connector mentioned above may be applied to any other suitable scenarios which need electrical connections.

It should be noted that, the examples cited above are only specific embodiments of the present invention, and clearly, the present invention is not limited to the above embodiments, and there are many similar variations therewith. For those skilled in the art, all variations directly derived or occurred from the disclosure of the present invention are intended to be within the scope of the present invention.

What is claimed is:

1. A connector housing, comprising:

a body having a first accommodating cavity accommodating a first terminal, a first insertion hole penetrating a first surface of the body and communicating with the first accommodating cavity, and a guiding portion protruding from the first surface of the body, integrally formed with the body, and surrounding at least a portion of the first insertion hole, the guiding portion includes a first sub-guiding portion that surrounds at least the portion of the first insertion hole, is coaxial with a first axis of the first insertion hole, and guides a first conductor into the first insertion hole.

2. The connector housing of claim 1, wherein the body has a second accommodating cavity and a second insertion hole, the second accommodating cavity accommodates a second terminal, the second insertion hole penetrates the first surface of the body and communicates with the second accommodating cavity.

3. The connector housing of claim 2, wherein the guiding portion includes a second sub-guiding portion, the second sub-guiding portion surrounds at least the portion of the second insertion hole, is coaxial with a second axis of the second insertion hole, and guides a second conductor into the second insertion hole.

4. The connector housing of claim 3, wherein the first sub-guiding portion and the second sub-guiding portion each have a first protrusion and a second protrusion which extend outwardly from the first surface.

5. The connector housing of claim 4, wherein the first protrusion has a first guiding surface tilted relative to the first surface to guide the first conductor into the first insertion hole, and the second protrusion has a second guiding surface tilted relative to the first surface to guide the second conductor into the second insertion hole.

6. The connector housing of claim 3, wherein the first sub-guiding portion and the second sub-guiding portion each have a first recess and a second recess that are recessed from the first surface towards an interior of the connector housing.

7. The connector housing of claim 6, wherein the first recess has a first sidewall tilted relative to the first surface to guide the first conductor into the first insertion hole, and the second recess has a second sidewall tilted relative to the first surface to guide the second conductor into the second insertion hole.

8. The connector housing of claim 3, wherein the first sub-guiding portion is integrally connected to the second sub-guiding portion.

9. The connector housing of claim 3, wherein the first sub-guiding portion is spaced apart from the second sub-guiding portion.

10. The connector housing of claim 2, wherein the body has a third accommodating cavity and a third insertion hole, the third accommodating cavity accommodates a third terminal, the third insertion hole penetrates the first surface and communicates with the third accommodating cavity.

11. The connector housing of claim 10, wherein, when a conductive connection is mounted on the connector housing, a third conductor of the conductive connection enters the third insertion hole and forms an electrical connection with the third terminal.

12. A connector, comprising:

a first terminal;

a second terminal;

a conductive connection including a first conductor and a second conductor; and a connector housing including a body having a first accommodating cavity accommodating the first terminal, a second accommodating cavity accommodating the second terminal, a first insertion hole penetrating a first surface of the body and communicating with the first accommodating cavity, a second insertion hole penetrating the first surface of the body and communicating with the second accommodating cavity, and a guiding portion protruding from the first surface of the body and integrally formed with the connector housing, the guiding portion including a first sub-guiding portion and a second sub-guiding portion, the first sub-guiding portion surrounds at least a portion of the first insertion hole, is coaxial with a first axis of the first insertion hole, and guides the first conductor into the first insertion hole to form an electrical connection with the first terminal of the first accommodating cavity, the second sub-guiding portion surrounds at least a portion of the second insertion hole, is coaxial with a second axis of the second insertion hole, and guides the second conductor into the second insertion hole to form an electrical connection with the second terminal of the second accommodating cavity.

13. The connector of claim 12, wherein the first sub-guiding portion and the second sub-guiding portion each have a first protrusion and a second protrusion which extend outwardly from the first surface.

14. The connector of claim 13, wherein the first protrusion has a first guiding surface tilted relative to the first surface to guide the first conductor into the first insertion hole, and the second protrusion has a second guiding surface tilted relative to the first surface to guide the second conductor into the second insertion hole.

15. The connector of claim 12, wherein the first sub-guiding portion and the second sub-guiding portion each have a first recess and a second recess that are recessed from the first surface towards an interior of the connector housing.

16. The connector of claim 15, wherein the first recess has a first sidewall tilted relative to the first surface to guide the first conductor into the first insertion hole, and the second recess has a second sidewall tilted relative to the first surface to guide the second conductor into the second insertion hole.

17. The connector of claim 12, wherein the body has a third accommodating cavity and a third insertion hole, the third accommodating cavity accommodates a third terminal, and the third insertion hole penetrates the first surface and communicates with the third accommodating cavity.

18. The connector of claim 17, wherein, when the conductive connection is mounted on the connector housing, a third conductor of the conductive connection enters into the third insertion hole and forms an electrical connection with the third terminal.

* * * * *